McCormick & Baker.
Grain Drill.
N°21,349. Patented Aug. 31, 1858.
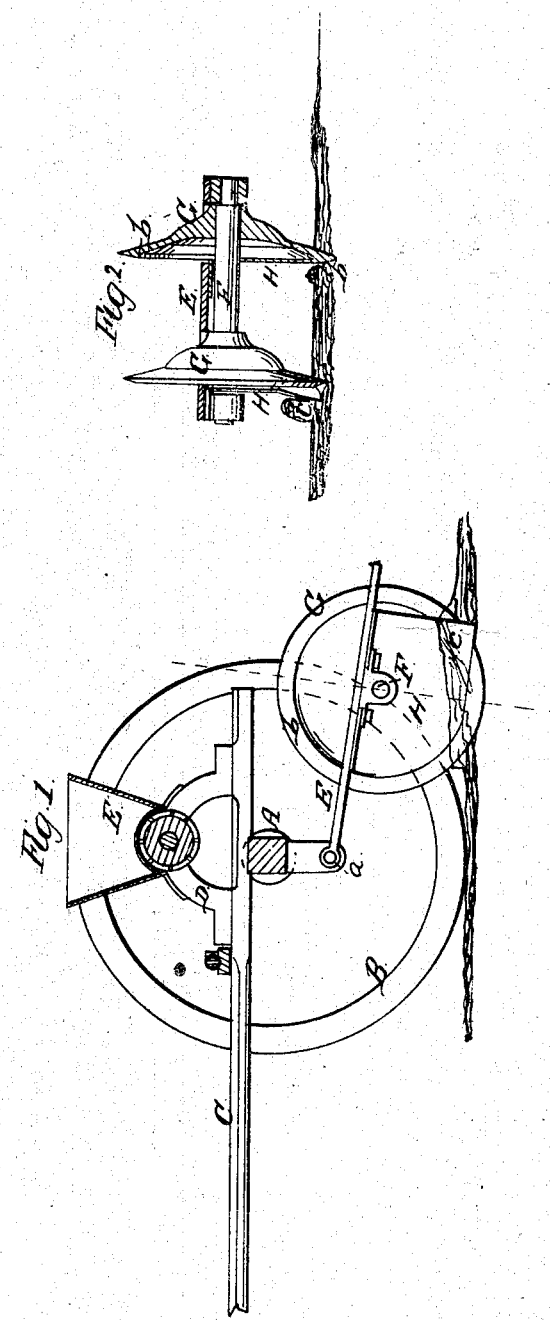

UNITED STATES PATENT OFFICE.

J. B. McCORMICK, OF VERSAILLES, KENTUCKY, AND W. R. BAKER, OF BOSTON, MASSACHUSETTS.

IMPROVEMENT IN SEEDING-MACHINES.

Specification forming part of Letters Patent No. 21,349, dated August 31, 1858.

*To all whom it may concern:*

Be it known that we, J. B. McCORMICK, of Versailles, in the county of Woodford and State of Kentucky, and W. R. BAKER, of Boston, in the county of Suffolk and State of Massachusetts, have invented a new and useful Improvement in Seeding-Machines; and we do hereby declare that the following is a full, clear, and exact description of the same, reference being had to the annexed drawings, making a part of this specification, in which—

Figure 1 is a side view of a seeding-machine with our improvement attached to it. Fig. 2 is a detached end view of our improvement, one part being in section.

Similar letters of reference indicate corresponding parts in the two figures.

This invention relates to a novel means employed for forming the drills or furrows and depositing the seed in the ground, as hereinafter fully shown and described.

To enable those skilled in the art to fully understand and construct our invention, we will proceed to describe it.

A represents an axle, and B B the wheels and C the thills or shafts which are attached to the axle. The back ends of the thills or shafts project beyond the back of the axle and form beds for supports D, on which a seed-box, E, is placed, said box being provided with any proper seed-distributing device.

To the under side of the axle A the front end of a frame, E, is attached by joints *a*, said frame being allowed to work freely up and down on said joints. In the frame E a shaft, F, is placed transversely, and on this shaft two wheels, G G, are placed and permanently secured. These wheels may be of concave or dish-form, and a shoulder, *b*, is formed in each wheel near its periphery, said shoulders being produced by having the concave or cavity of the wheels pass horizontally inward parallel with the axle A a short distance, as shown clearly in Fig. 2.) The wheels G G are formed with sharp edges, both sides of the wheels near their peripheries being basiled. (See Fig. 2.) The wheels G G may be made of cast or wrought metal, and of any suitable dimensions—probably wheels a foot and a half in diameter will be the size generally used.

To the under side of the frame E two plates or shares, H H, are attached. These plates or shares are placed one by the concave side of each wheel G. The front ends of the plates or shares are rounded, and they fit within the shoulders *b* of the wheels, said shoulders serving as a protection or guard to the plates. The back ends of the plates are each curved a little outward, so as to form a sort of mold-board, *c*, to make the necessary furrows. This is clearly shown in Fig. 2. The back parts or ends of the plates or shares H do not fit within the shoulders *b* of the wheels G. They project outward a trifle from it. The plates or shares H are constructed of metal, either cast or wrought, and the mold-board *c* or curved portions of the plates or shares H may be sufficiently curved to turn over the earth or to merely press it at one side.

The seed is conducted by proper tubes down into the spaces between the wheels and plates, and the wheels by their rotation, caused by the forward movement of the machine, will discharge the seed out at the back part of the wheels, between the wheels and plates or shares, the seed being deposited in the drills or furrows made by the penetration of the wheels into the earth and the mold-boards *c* of the shares or plates H H.

The wheels G will cut through all trash—such as sods, weeds, and the like—so that such substances will not obstruct in any degree the proper working of the machine; and obstacles—such as stumps, stones, &c.—that may lie in the path of the wheels are readily passed over in consequence of the free movement of the frame E.

We would remark that instead of having the wheels G G concave the plates or shares H may be thus made and the wheels G be flat. This plan, however, would be merely reversing the form of the parts. We would further remark that any number of wheels may be used on one machine, several frames E being attached to the axle A.

We do not claim broadly the employment of a hollow wheel for depositing the seed; but,

Having thus described our invention, what we claim as new, and desire to secure by Letters Patent, is—

The arrangement and combination of the rotating wheel G with the stationary plates or shares H, substantially as and for the purpose herein shown and described.

J. B. McCORMICK.
W. R. BAKER.

Witnesses:
EDW. W. SHANDS,
S. PERIT RAWLE.